United States Patent
McGuire, Jr.

(10) Patent No.: US 7,203,421 B2
(45) Date of Patent: Apr. 10, 2007

(54) LITTROW GRATING BASED OADM

(75) Inventor: James P. McGuire, Jr., Pasadena, CA (US)

(73) Assignee: Optical Research Associates, Pasadena, CA (US)

( * ) Notice: Subject to any disclaimer, the term of this patent is extended or adjusted under 35 U.S.C. 154(b) by 613 days.

(21) Appl. No.: 10/262,675

(22) Filed: Sep. 30, 2002

(65) Prior Publication Data

US 2003/0090762 A1 May 15, 2003

Related U.S. Application Data

(60) Provisional application No. 60/397,944, filed on Jul. 23, 2002, provisional application No. 60/388,358, filed on Jun. 12, 2002, provisional application No. 60/349,963, filed on Jan. 18, 2002, provisional application No. 60/325,670, filed on Sep. 28, 2001.

(51) Int. Cl.
*H04J 14/00* (2006.01)

(52) U.S. Cl. .............................. 398/49; 398/43; 398/48; 385/18

(58) Field of Classification Search ............ 398/45–58, 398/79–90, 87, 88, 83; 359/6
See application file for complete search history.

(56) References Cited

U.S. PATENT DOCUMENTS

| | | | |
|---|---|---|---|
| 4,244,045 A | 1/1981 | Nosu et al. | |
| 4,482,994 A | 11/1984 | Ishikawa | |
| 4,768,849 A | 9/1988 | Hicks, Jr. | |
| 4,998,793 A | 3/1991 | Henry et al. | |
| 5,040,169 A | 8/1991 | Guerin et al. | |
| 5,048,909 A | 9/1991 | Henry et al. | |
| 5,414,540 A | 5/1995 | Patel et al. | |
| 5,652,814 A | 7/1997 | Pan et al. | |
| 5,745,271 A | 4/1998 | Ford et al. | |
| 5,786,915 A | 7/1998 | Scobey | |
| 5,822,095 A | 10/1998 | Taga et al. | |
| 5,859,717 A | 1/1999 | Scobey et al. | |

(Continued)

FOREIGN PATENT DOCUMENTS

CA 2342719 * 4/2001

(Continued)

OTHER PUBLICATIONS

Scobey et al., Hybrid thin film WDM and optical switch devices for optical add/drop, Optical Fiber Conference, 2000, Conference Paper, WM42-3.

(Continued)

*Primary Examiner*—Kenneth Vanderpuye
*Assistant Examiner*—Luis Garcia
(74) *Attorney, Agent, or Firm*—Knobbe, Martens, Olson & Bear, LLP

(57) ABSTRACT

A multi-channel optical switching system particularly usable as a programmable optical add/drop multiplexer in a multi-wavelength communication system. The switching system uses a grating operating at Littrow that separates a multi-channel optical signal into a plurality of optical channels, and combines a plurality of optical channels into a multi-channel optical signal. The system also uses a plurality of optical ports optically coupled to the grating and a selecting device to select which optical channel is directed to which of the optical ports.

42 Claims, 7 Drawing Sheets

U.S. PATENT DOCUMENTS

| | | | |
|---|---|---|---|
| 5,881,199 A | 3/1999 | Li | |
| 5,912,748 A | 6/1999 | Wu et al. | |
| 5,943,454 A | 8/1999 | Aksyuk et al. | |
| 5,960,133 A * | 9/1999 | Tomlinson | 385/18 |
| 6,097,859 A * | 8/2000 | Solgaard et al. | 385/17 |
| 6,185,023 B1 | 2/2001 | Mizrahi | |
| 6,198,857 B1 | 3/2001 | Grasis et al. | |
| 6,204,946 B1 | 3/2001 | Aksyuk et al. | |
| 6,208,442 B1 | 3/2001 | Liu et al. | |
| 6,212,312 B1 | 4/2001 | Grann et al. | |
| 6,263,134 B1 * | 7/2001 | Laude | 385/37 |
| 6,275,623 B1 * | 8/2001 | Brophy et al. | 385/14 |
| 6,285,500 B1 | 9/2001 | Ranalli et al. | |
| 6,285,810 B1 | 9/2001 | Fincato et al. | |
| 6,289,145 B1 * | 9/2001 | Solgaard et al. | 385/17 |
| 6,320,996 B1 | 11/2001 | Scobey et al. | |
| 6,327,019 B1 | 12/2001 | Patel et al. | |
| 6,351,581 B1 | 2/2002 | Doerr et al. | |
| 6,407,839 B1 | 6/2002 | Cao | |
| 6,434,291 B1 | 8/2002 | Kessler et al. | 385/24 |
| 6,439,728 B1 * | 8/2002 | Copeland | 359/515 |
| 6,498,872 B2 * | 12/2002 | Bouevitch et al. | 385/24 |
| 6,501,877 B1 | 12/2002 | Weverka et al. | |
| 6,535,664 B1 | 3/2003 | Anderson | |
| 6,542,657 B2 | 4/2003 | Anderson | |
| 6,549,699 B2 | 4/2003 | Belser et al. | |
| 6,560,000 B2 * | 5/2003 | Iyer et al. | 359/238 |
| 6,560,020 B1 * | 5/2003 | Kramer | 359/569 |
| 6,625,346 B2 * | 9/2003 | Wilde | 385/24 |
| 6,631,222 B1 | 10/2003 | Wagener et al. | |
| 6,634,810 B1 * | 10/2003 | Ford et al. | 398/88 |
| 6,636,654 B2 | 10/2003 | McGuire, Jr. | |
| 6,657,770 B2 | 12/2003 | Marom et al. | |
| 6,678,445 B2 * | 1/2004 | Tomlinson et al. | 385/37 |
| 6,707,959 B2 * | 3/2004 | Ducellier et al. | 385/17 |
| 6,751,415 B1 * | 6/2004 | Fabiny | 398/50 |
| 6,785,038 B2 * | 8/2004 | Hichwa et al. | 359/290 |
| 6,798,941 B2 * | 9/2004 | Smith et al. | 385/18 |
| 7,019,885 B2 * | 3/2006 | Michalicek | 359/290 |
| 2001/0009596 A1 | 7/2001 | Solgaard et al. | |
| 2001/0052980 A1 | 12/2001 | Tada | |
| 2002/0076146 A1 | 6/2002 | Iyer et al. | |
| 2002/0131698 A1 | 9/2002 | Wilde | |
| 2002/0196493 A1 | 12/2002 | Marom | |
| 2002/0196494 A1 | 12/2002 | McGuire, Jr. | |
| 2002/0196520 A1 | 12/2002 | Marom et al. | |
| 2002/0197000 A1 | 12/2002 | Marom | |
| 2003/0012486 A1 | 1/2003 | Ducellier et al. | |
| 2003/0053749 A1 | 3/2003 | Weverka et al. | |
| 2004/0130774 A1 * | 7/2004 | Giles et al. | 359/290 |

FOREIGN PATENT DOCUMENTS

| | | | |
|---|---|---|---|
| EP | 1001287 A2 | 5/2000 | |
| EP | 1298467 A1 | 4/2003 | |
| WO | WO 01/07947 A1 | 2/2001 | |
| WO | WO 01/37021 A1 | 5/2001 | |
| WO | WO 01/46731 A2 | 6/2001 | |
| WO | WO 02/25358 A2 | 3/2002 | |
| WO | WO 02/079832 A1 | 10/2002 | |

OTHER PUBLICATIONS

PCT International Search Report dated Feb. 10, 2003 from corresponding International Application No. PCT/US02/31219 filed Sep. 30, 2002.

\* cited by examiner

LITTROW GRATING BASED OADM

RELATED APPLICATION

This application claims priority of U.S. Provisional Application Nos. 60/325,670 filed Sep. 28, 2001, 60/349,968 filed Jan. 18, 2002, 60/388,358 filed Jun. 12, 2002, and 60/397,944 filed Jul. 23, 2002, the discosures of which are incorporated fully herein by reference.

FIELD OF THE INVENTION

This invention relates to the field of optical communications, and more particularly, to a reconfigurable optical add/drop system for use in optical multiplexing.

BACKGROUND OF THE INVENTION

For several decades, fiber optics have been used for communication. Specifically, fiber optics are used for data transmission and other telecommunication applications. Despite the enormous information carrying capacity of fiber, as compared to conventional copper cable, the high cost of installing fiber optics presents a barrier to full implementation of fiber optics, particular as the "last mile", from the central office to residences and businesses.

One method of increasing carrying capacity without incurring additional installation costs has been to multiplex multiple signals onto a single fiber using various methods, such as time division multiplexing, where two or more different signals are carried over the same fiber, each sharing a portion of time. Another, more preferred multiplexing method is wavelength division multiplexing (WDM), where two or more different wavelengths of light are simultaneously carried over a common fiber.

Until recently, typical fibers used for communications applications had preferred wavelength bands centered at 850 nm, 1300 nm, and 1550 nm, wherein each band typically had a useful bandwidth of approximately 10 to 40 nm depending on the application. Transmission within these bands was preferred by systems designers because of low optical attenuation. Recent advances in fiber design now provides fiber that have low attenuation over a very broad transmission range, from 1300 –620 nm.

Wavelength division multiplexing can separate a fiber's bandwidth into multiple channels. Dividing bandwidth into multiple discreet channels, such as 4, 8, 16, 40, or even as many as 160 channels, through a technique referred to as dense channel wavelength division multiplexing (DWDM), is a relatively lower cost method of substantially increasing telecommunication capacity, using existing fiber optic transmission lines. Techniques and devices are required, however, for multiplexing the different discreet carrier wavelengths. That is, the individual optical signals must be combined onto a common fiber-optic line or other optical waveguide and then later separated again into the individual signals or channels at the opposite end or other point along the fiber-optic cable. Thus, the ability to effectively combine and then separate individual wavelengths (or wavelength sub-ranges) is of growing importance to the fiber-optic telecommunications field and other fields employing optical instruments.

Optical multiplexers are known for use in spectroscopic analysis equipment and for the combination or separation of optical signals in wavelength division multiplexed fiber-optic telecommunications systems. Known devices for this purpose have employed, for example, diffraction gratings, prisms and various types of fixed or tunable filters.

Approaches for selectively removing or tapping a channel, i.e., selective wavelengths, from a main trunk line carrying multiple channels, i.e., carrying optical signals on a plurality of wavelengths or wavelength sub-ranges, is suggested, for example, in U.S. Pat. No. 4,768,849 to Hicks, Jr. Hicks, shows filter taps, as well as the use of gangs of individual filter taps, each employing high performance, multi-cavity dielectric pass-band filters and lenses for sequentially removing a series of wavelength sub-ranges or channels from a main trunk line. The filter tap of Hicks, returns a multi-channel signal to the main trunk line as it passes the desired channel to a branch line. One known demux is disclosed in Pan et al., U.S. Pat. No. 5,652,814, FIG. 25. In Pan et al., the WDM input signal is cascaded through individual filter assemblies, consisting of a fiber collimator, thin film filter, and a fiber focusing lens. Each filter is set for a given wavelength. However, aligning the fibers for each wavelength is costly and errors in the alignment contribute significantly to the system losses. Further, FIG. 13 of Pan et al. teaches the use of a dual fiber collimator, thin film filter, and a dual fiber focusing lens to selectively DROP and ADD a single wavelength or range of wavelengths. As discussed above, aligning the collimators is expensive.

Polarization dependent loss (PDL) is also a problem in WDM system because the polarization of the light drifts as it propagates through the fiber and furthermore this drift changes over time. Thus, if there is PDL in any component, the drifting polarization will change the signal level, which may degraded the system operation.

Other multiplexer devices may be employed to add or drop channels in WDM systems. These systems are commonly known as optical add/drop multiplexers, or OADM. Another OADM, disclosed by Mizrahi U.S. Pat. No. 6,185,023, employs fiber Bragg gratings to demux and mux signals in a WDM system. This method requires optical circulators and multiple components.

However, the multi channel OADM designs discussed above are not programmable by the end user. That is, each multiplexers is designed and manufactured to mux (add) specific channels; or when used in reverse each multiplexers is also designed and manufactured to demux (drop) specific channels. This limitation mandates that the optical system's parameters be fixed before installation. Changes are not possible without replacing the fixed optical multiplexers with different designed multiplexers. This is expensive.

One known programmable OADM is discussed in Boisset et al, International Publication No. WO01/13151. In Boisset et al., the desired add/drop channel is programmed by translating a segmented filter. To achieve this translation however, a large mechanical mechanism is employed. A further limitation to Boisset et al. is that only a single channel may be added or dropped per device. Designers may employ multiple devices, deployed in series, and programmed as necessary to add/drop the correct channel; however, this approach requires multiple devices and has multiple points of failure. Furthermore, the size of such a device would be overly large and therefore not practical for many applications where space is limited.

Two other programmable OADMs are disclosed by Tomlinson, U.S. Pat. No. 5,960,133, and Aksyuk, et al, U.S. Pat. No. 6,204,946, both use bulk optics and gratings to demultiplex and multiplex WDM input and output signal. While OADM's disclosed by Tomlinson and Aksyuk are both programmable, neither provides for discrete adding or dropping of an individual optical signal in a multi signal system. To achieve discrete adding or dropping of an individual optical signal in a multi signal system using the systems disclosed in Tomlinson and Aksyuk, additional components are required. All the Add wavelengths must be multiplexed onto a single fiber before it is sent to the OADM. Likewise, a demultiplexer must be added to the Drop port to access the individual wavelength channels. The additional components require additional space, add attenuation, and add cost to the system.

It is an object of the present invention to provide improved optical multiplexing devices which reduce or wholly overcome some or all of the aforesaid difficulties inherent in prior known devices. Particular objects and advantages of the invention will be apparent to those skilled in the art, that is, those who are knowledgeable and experienced in this field of technology, in view of the following disclosure of the invention and detailed description of certain preferred embodiments.

SUMMARY OF THE INVENTION

In accordance with a first aspect of the invention, a programmable Littrow grating based optical add/drop multiplexing device, programmed to add and/or drop one or more optical channels from/to a multi-channel light signal, comprises a focal plane, in combination with a lens in combination with a prism, a Littrow grating, and a plurality of programmable mirrors.

The focal plane further comprises an IN port for receiving a multi-channel optical signal, a PASS port for transmitting a multi-channel optical signal, a plurality of ADD ports for receiving a plurality of optical channels, a plurality of DROP ports for transmitting a plurality of optical channels, and a plurality of programmable mirrors for directing light channels.

The multi-channel light enters the device by way of the IN port and is directed through the Lens to the Littrow grating, where selected channels are dispersed and directed through the lens and focused onto to the plurality of programmable mirrors. The Littrow grating separates the multi-channel optical signal into its individual optical channels and directs the individual optical channels through the Prism, the Lens, and onto the programmable mirror that corresponds with that individual channel.

Depending upon the programmed state of the mirrors, the channels are either directed through the lens, prism, and Littrow grating (or another wavelength separating medium) which combine the channels into a multi-channel light signal and directs it out of the system by way of the prism, lens and pass port, or the channels are directed through the lens, and mirror so as to exit the system by way of the Lens and one of the plurality of drop ports.

In the instance where the programmed state of the mirrors directs one or more channels through one of the plurality of drop ports, one or more channels may enter the device by way of one of the plurality of add ports, and are directed through the lens, mirror, and lens, to the one of the plurality of programmable mirrors so as to exit the system by way of the lens, prism, and Littrow grating, which combines the channels into a multi-channel light signal and directs it out of the system by way of the prism, lens and pass port.

To reduce polarization dependent loss (PDL) in the system a quarter-wave plate (QWP) may also be employed between the Lens and Littrow grating. The QWP rotates the polarization so that light that is s-polarized on the first pass is p-polarized on the second pass and there is no net polarization dependent loss (PDL) for light traveling between the IN and PASS ports.

DETAILED DESCRIPTION OF THE INVENTION

The Littrow grating based OADM of the invention has numerous applications, including use in fiber optic telecommunications systems. For purposes of illustration, the preferred embodiments described below in detail multiplexing and demultiplexing, and adding and dropping channels, in wavelength division multiplexing and demultiplexing for a multi-channel fiber optic telecommunication systems. Exemplary references to an optical channel, or simply to a channel, should be understood to mean an optical signal with a centered wavelength and an upper and lower wavelength. Channel spacing is measured from the center of the first channel to the center of an adjacent channel.

Figure 1:
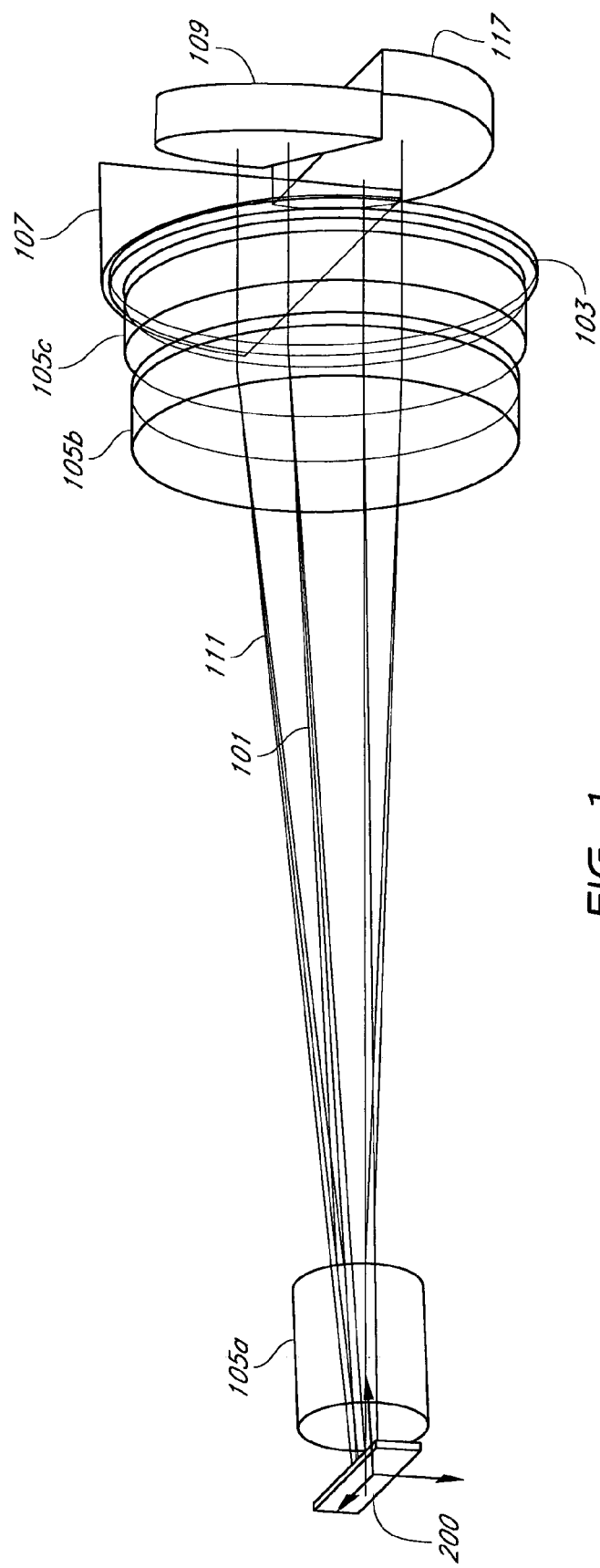
FIG. 1 is a perspective view of a first embodiment of a Littrow grating based OADM detailing the various channel paths through the device.

A three channel Littrow grating based OADM, employing one embodiment of the invention, is detailed in FIG. 1. It is of note that while only three channels are used in this example, a substantially larger number of channels/ports may be employed. The Littrow grating based OADM allows for demultiplexing and multiplexing separate optical channels onto or off of a multi-channel light signal. The OADM of FIG. 1 may be dynamically programmed to demultiplex and multiplex any combination of channels onto or off the multi-channel light signal.

A first embodiment of the programmable OADM device of FIG. 1 comprises a focal plane 200 in combination with Lens 105, a prism 107, and a Littrow grating 109. The device of FIG. 1 may be mounted within an enclosure optimized for optical transmission, including a gas-filled enclosure, or the like.

A Littrow grating is a grating that operates at or near Littrow. Littrow is a special, but common case, in which the light is diffracted off the grating back toward the direction from which it came (i.e., a=b); this is called the Littrow configuration, for which the grating equation becomes:

$$ml = 2d \sin(a)$$

where a is the incident angle, b is the diffracted angle, m is the grating order, l is the wavelength, and d is the grating groove spacing. In one embodiment, the grating is used near the Littrow condition, so the same lens can be used for collimating and focusing the light. Further, using the grating near the Littrow condition takes advantage of the high diffraction efficiency of the grating near the Littrow condition.

Lens 105 may be comprised of multiple lens elements 105a, 105b and 105c. It is well known in the art that a lenses may be comprised of multiple lens elements to achieve a particular optical prescription.

Prism 107 may optionally be used in any embodiment of the system. Temperature changes cause grating to expand and contract. As gratings expand and contract the wavelength-sized gradations that cause diffraction increase and decrease causing a change in the diffraction angle from a grating. Prism 107 may be used to minimize the thermal affects on Grating 109. When Prism 107 and Grating 109 are properly designed and configured the effects of temperature on the system are greatly reduced. However, some embodiments of the system do not contain Prism 107.

Quarter-wave plate (QWP) 103 may also be employed between the Lens and Littrow grating to reduce polarization dependent loss (PDL) in the system a. The QWP 103 rotates the polarization so that light that is s-polarized on the first pass is p-polarized on the second pass and there is no net polarization dependent loss (PDL) for light traveling between the IN and PASS ports.

Figure 2:
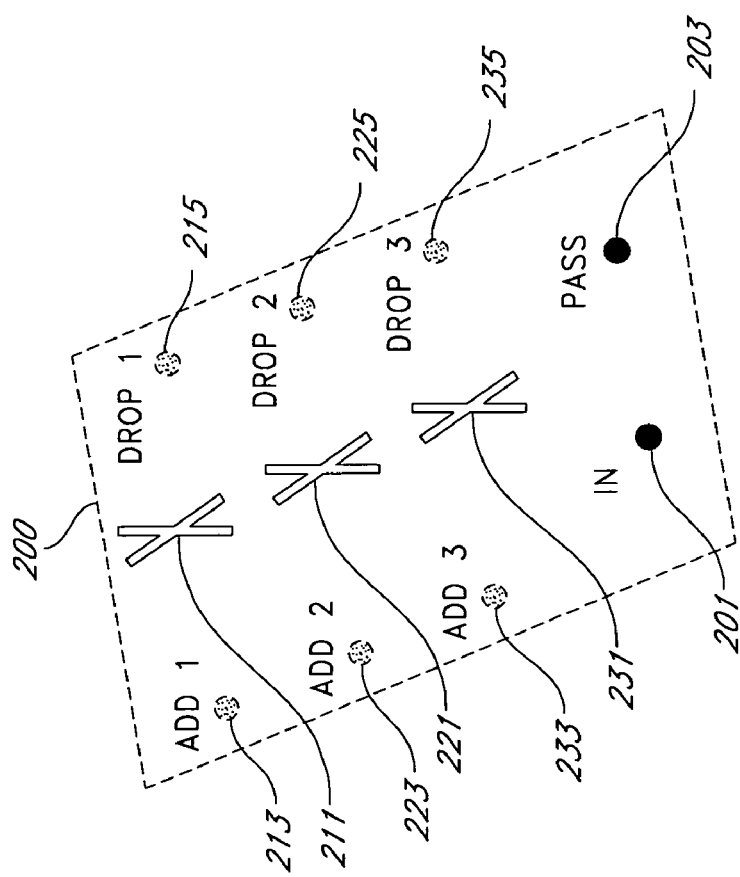
FIG. 2 is a perspective view of the Focal Plane of the embodiment of FIG. 1.
Figure 3:
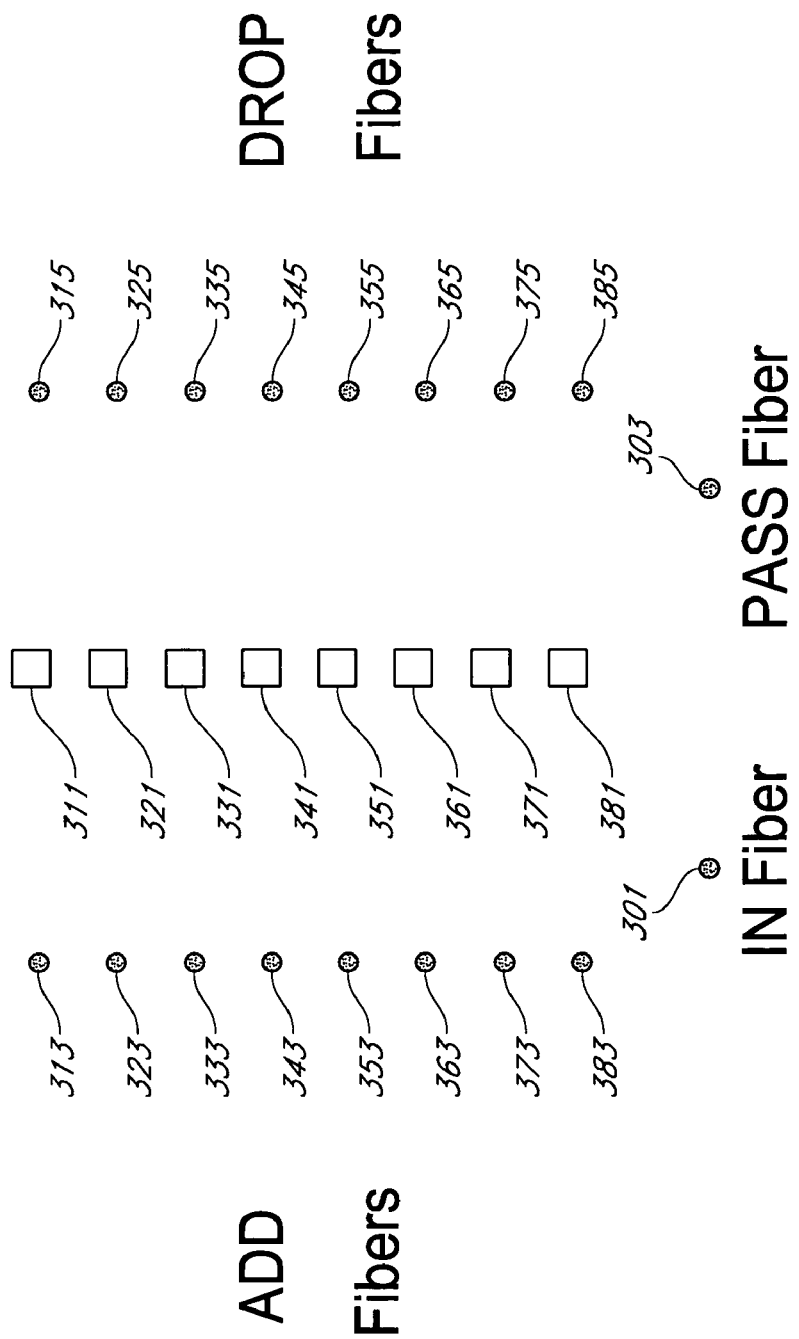
FIG. 3 is a schematic view of a Focal Plane for an eight-channel embodiment of a Littrow grating based OADM.

The focal plane 200 of FIG. 2 further comprises an IN port 201 for receiving a multi-channel optical signal 101, a PASS port 203 for transmitting a multi-channel optical signal, a plurality of ADD ports 213, 223, and 233, for receiving a plurality of optical channels, a plurality of DROP ports 215, 225, 235, for transmitting a plurality of optical channels, and a plurality of Programmable Mirrors 211, 221, 231, for directing light channels. Each DROP and ADD port is for a preassigned wavelength. All of these component are precisely aligned with each other, and mounted together so as to accommodate the entrance and exit of optical signals. Larger focal planes may be constructed and an eight channel system's focal plane is depicted in FIG. 3 comprising an IN port 301 for receiving a multi-channel optical signal 101, a PASS port 303 for transmitting a multi-channel optical signal, a plurality of ADD ports 313, 323, 333, 343, 353, 363, 373, 383 for receiving a plurality of optical channels, a plurality of DROP ports 315, 325, 335, 345, 355, 365, 375, 385 for transmitting a plurality of optical channels, and a plurality of Programmable Mirrors 311, 321, 331, 341, 351, 361, 371, 381 for directing light channels.

Turning again to FIG. 1, as well as to FIG. 2, a multi-channel light signal 101 enters the device through the IN port 201 on the focal plane 200, and is directed through Lens 105. The multi-channel light signal 101 is directed through the Lens 105, QWP 103, Prism 107, and Littrow grating 109. The Littrow grating 109 diffracts the individual channels of the multi-channel light signal 101 (hereafter channels) towards the Lens 105, QWP 103, to the channel's associated Programmable Mirror 211, 221, or 231.

Depending upon the programmed state of the Programmable Mirrors channels received via the IN port 201 are either passed via the PASS port 203 or dropped via one of the plurality of DROP ports 215, 225, or 235. In the event one or more channels received via the IN port 201 are passed via PASS port 203, the channel(s) are directed through the Lens 105, QWP 103, Prism 107, and Littrow grating 109 which multiplexes the channel with other passed and added channels into a multi-channel light signal 111 and directs it out of the system by way of the Prism 107, QWP 103, Lens 105 and PASS port 203.

In the event one of more channels received via the IN port 201 are dropped via one of the plurality of DROP ports 215, 225, or 235, the channel(s) are directed through the Lens 105, and mirror 117 so as to exit the system by way of the Lens 105 and one of the plurality of DROP ports 215, 225, or 235 corresponding to the channel. Because the mirrors may be programmed individually, it will be clear to one skilled in the art that any channel may be dropped or passed.

In the instance where one or more of the received via the IN port 201 are dropped via one of the plurality of DROP ports 215, 225, or 235, one or more channels corresponding channels may enter the device through one of the plurality of ADD ports 213, 223, or 233. These added channels enter the system by way of one of the plurality of ADD ports 213, 223, or 233, and are directed through the Lens 105, Lens 105, mirror 117, Lens 105, to the one of the plurality of Programmable Mirrors corresponding to the channel so as to exit the system by way of the Lens 105, QWP 103, Prism 107, and Littrow grating 109, which multiplexes the channel with other passed and added channels into a multi-channel light signal 111 and directs it out of the system by way of the Prism 107, QWP 103, Lens 105 and PASS port 203.

Figure 4:
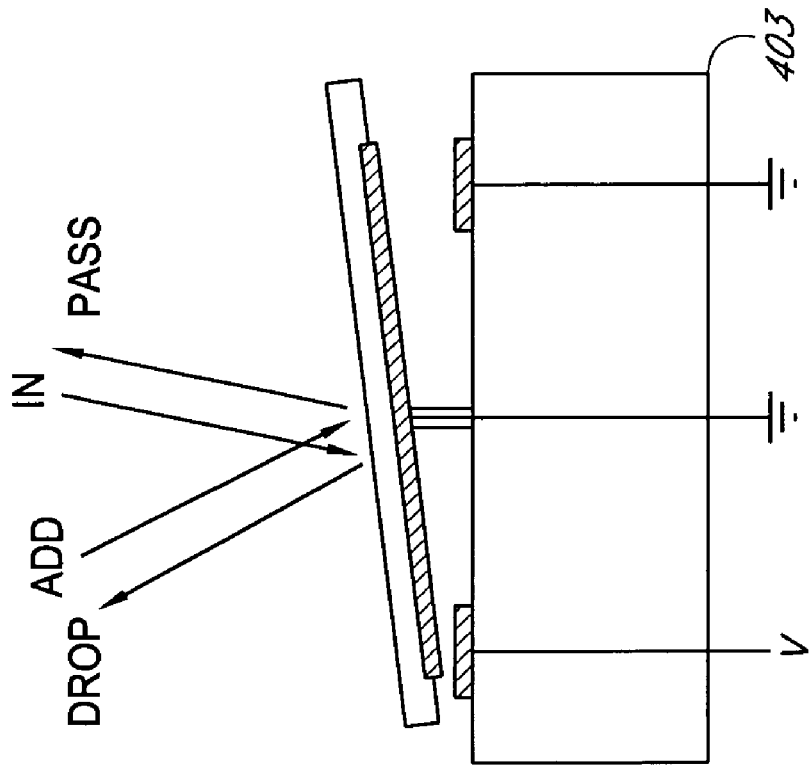
FIG. 4 is a schematic side view of a MEMS mirror in IN/PASS and DROP/ADD modes.
Figure 4:
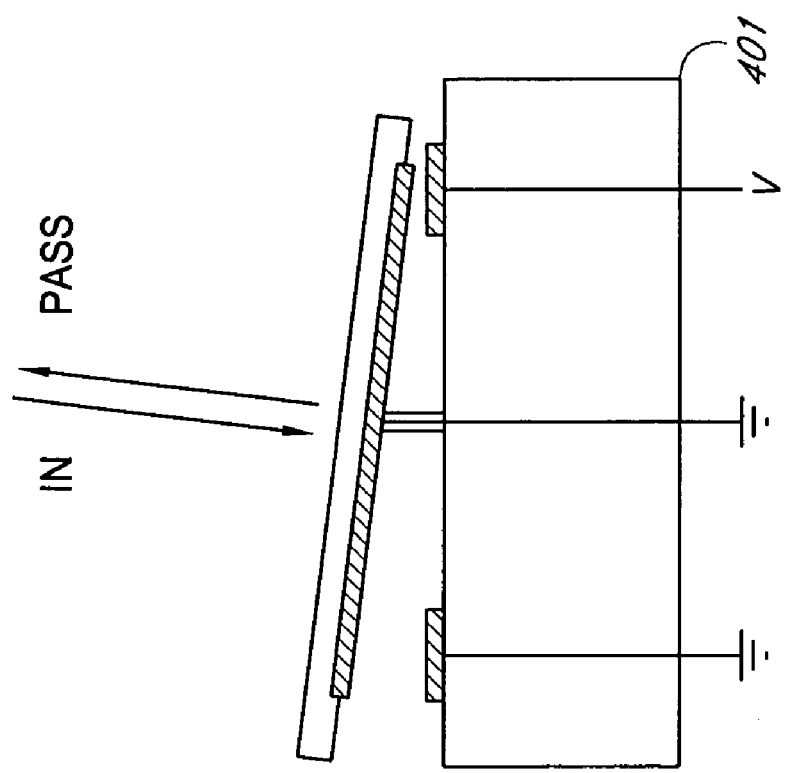

Turning to FIG. 4, in one embodiment the Programmable Mirrors 401 and 403 are constructed using Micro Electrical Mechanical Systems (MEMS). Programming of the Programmable Mirrors 401 and 403 is achieved by applying an electrical signal to the MEMS mirror. The Programmable Mirror 401 is programmed to reflect the IN port to the PASS port. The Programmable Mirror 403 is programmed to reflect the IN port to the DROP port, and to reflect the ADD port to the PASS port. A larger mirror may be employed by design to control more then one channel. Of course, other types of mirror actuators could be used.

By engaging the channel mirrors, one or more separate channels may be dynamically routed onto or off of a multi-channel light signal. Further, by engaging the channel mirrors as a function of time and in synchronous conjunction with other system components, time-division multiplexing of optical signals may be achieved.

One or more quarter-wave plates (QWP) may be employed in the system to reduce polarization dependent loss (PDL) in the system. The preferred location of the QWP is between Lens 105 and Grating 109. QWP may be positioned such that they are substantially normal to the propagating light beam and the retardance axis is at 45 degrees to the light that is polarized parallel and perpendicular to the grating graduations. Passage through the QWP converts the parallel and perpendicular polarized components of the light into right and left circularly polarized states. Reflection off the grating converts changes the handedness of the polarization: right circularly polarized light into left circularly polarized light and visa versa. Passage through the QWP the second time converts the light back to a linearly polarized state, but it's departing polarization state is orthogonal to the input state. Thus, during one pass through the system the light is parallel and on the next is perpendicular leaving a substantially zero PDL for the system.

Consider again the three channel system depicted in FIG. 1, where the multi-channel light signal 101 contains:

a channel one 501 (see FIG. 5)—which is to be passed via PASS port 203;

a channel two 601 (see FIG. 6)—which is to be dropped via DROP port 225;

no channel three comes into the system; and a channel three 701 (see FIG. 7) is added via ADD port 233 and passed via PASS port 203.

Table 1 details the desired channel operation (i.e., PASS, DROP, ADD, etc.) for each channel, as well as the Programmable Mirror's state.

TABLE 1

| CHANNEL | MODE | MIRROR STATE |
| --- | --- | --- |
| One | PASS | IN to PASS |
| Two | DROP | In to DROP |
| Three | ADD | ADD to PASS |

An optical prescription for a three channel Littrow grating based OADM is provided in Table 2 in CODE V format. The numerical aperture of the lens is 0.17 to accommodate standard fiber and the grating has 600 lp/mm. The root mean square wavefront error is less than 0.03 waves in double pass over the temperature range of −20 to +70 degrees centigrade, when the mount is made of 416 Stainless Steel.

TABLE 2

| | RADIUS | | THICK-NESS | | RMD | GLASS |
| --- | --- | --- | --- | --- | --- | --- |
| OBJ: | INFINITY | | 5.584779 | | | |
| 1: | −62.78788 | | 16.838678 | | | SF11_SCHOTT |
| 2: | −39.52723 | | 96.862455 | | | AIR |
| 3: | −109.42245 | | 1.700000 | | | NSF15_SCHOTT |
| 4: | 76.61669 | | 7.195070 | | | NBAK1_SCHOTT |
| 5: | −58.64552 | | 0.100000 | | | AIR |
| 6: | 520.40928 | | 1.700000 | | | NBK10_SCHOTT |
| 7: | 48.24900 | | 6.885228 | | | NBAK1_SCHOTT |
| 8: | −199.75265 | | 0.100000 | | | AIR |
| 9: | INFINITY | | 10.148101 | | | NBK7_SCHOTT |
| 10: | INFINITY | | 2.885689 | | | AIR |
| ADE: | −22.806501 | BDE: | 0.000000 | CDE: | 0.000000 | DAR |
| STO: | INFINITY | | −50.000000 | REFL | | AIR |
| GRT: | | | | | | |
| GRO: | −1 | GRS: | 0.001667 | | | |
| GRX: | 0.000000 | GRY: | 1.000000 | GRZ: | 0.000000 | |
| ADE: | −15.353235 | BDE: | 0.000000 | CDE: | 0.000000 | |

Figure 5:
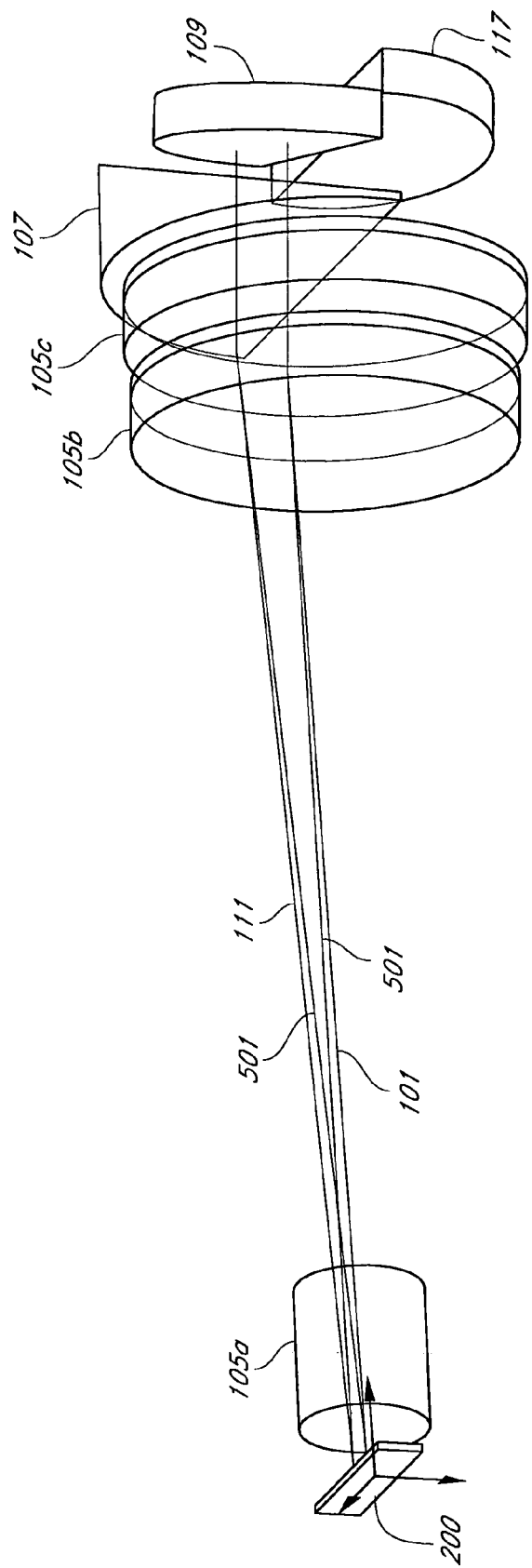
FIG. 5 is a perspective view of the embodiment of FIG. 1 detailing the channel paths through the device for an PASS channel.
Figure 6:
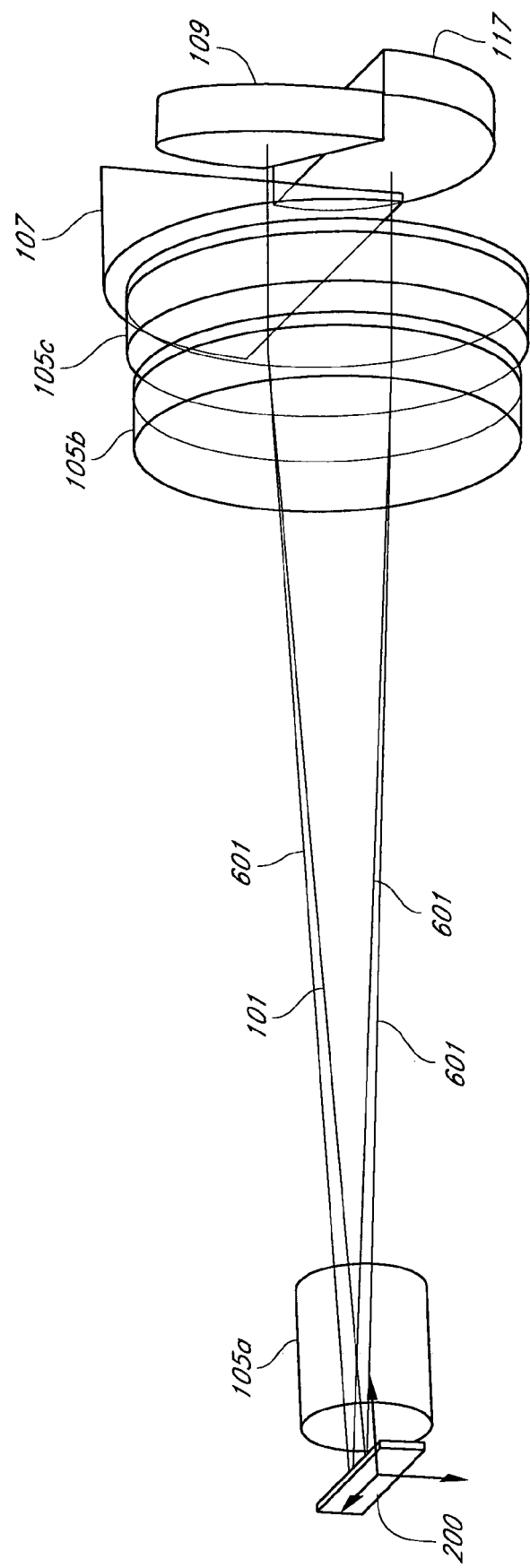
FIG. 6 is a perspective view of the embodiment of FIG. 1 detailing the channel paths through the device for an DROP channel.

Turning next to FIG. 5 and FIG. 2, the path of channel one 501 of the three channel multi-channel collimated light signal 101 is more clearly illustrated. Recall that channel one 501 is to be received and PASSED by the system as follows. The multi-channel light signal 101 enters the device through the IN port 201 and is directed through the Lens 105, Prism 107, and Littrow grating 109. Littrow grating 109 demultiplexes the channels of the Multi-channel light signal 101 and diffracts channel one 501 through the Prism 107 and Lens 105 to Programmable Mirror 211. The state of Programmable Mirror 211 is set to "IN to PASS" and therefore reflects channel one 501 through Lens 105, Prism 107 to Grating 109. Grating 109 multiplexes channel one 501 with other passed and added channels into a multi-channel light signal 111 and directs multi-channel light signal 111 out of the system by way of the Prism 107, Lens 105 and PASS port 203. Turning next to FIG. 6 and FIG. 2, the path of channel two 601 of the three channel multi-channel collimated light signal 101 is more clearly illustrated. Recall that channel two 601 is to be received and dropped by the system. The multi-channel light signal 101 enters the device through the IN port 201 and is directed through the Lens 105, Prism 107, and Littrow grating 109. Littrow grating 109 demultiplexes the channels of the Multi-channel light signal 101 and diffracts channel two 601 through the Prism 107 and Lens 105 to Programmable Mirror 221. The state set to "IN to DROP" and therefore reflects channel two 601 through Lens 105, to Mirror 117. Mirror 117 reflects channel two 601 out of the system by way of Lens 105 and DROP port 225.

Figure 7:
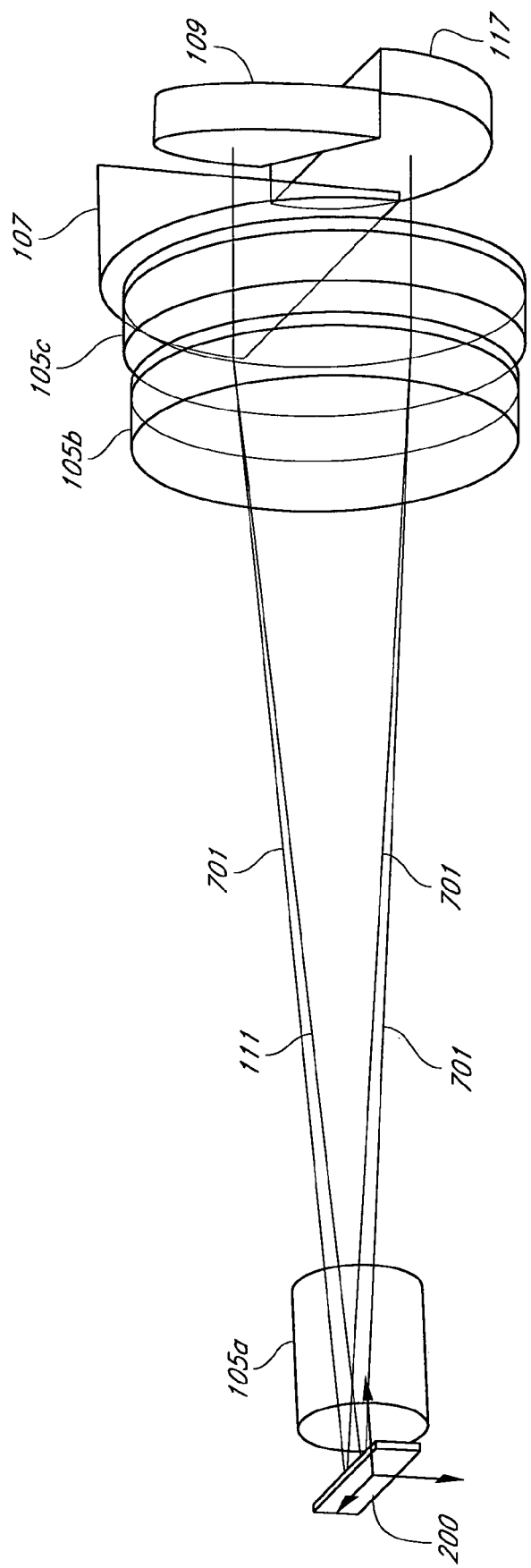
FIG. 7 is a perspective view of the embodiment of FIG. 1 detailing the channel paths through the device for an ADD channel.

Turning next to FIG. 7 and FIG. 2, the path of channel three 701 of the three channel multi-channel collimated light signal 101 is more clearly illustrated. Recall that the multi-channel light signal 101 does not contain channel three 701, but instead, channel three 701 is added to multi-channel light signal 111 and directed out of the system. Channel three 701 enters the device through ADD 233 and is directed through the Lens 105, and Mirror 117. Mirror 117 reflects channel three 701 to Programmable Mirror 231 by way of Lens 105. The state of Programmable Mirror 231 is set to "ADD to PASS" and therefore reflects channel three 701 through Lens 105, Prism 107 to Grating 109. Grating 109 multiplexes the channel with other passed and added channels into a multi-channel light signal 111 and directs multi-channel light signal 111 out of the system by way of the Prism 107, Lens 105 and PASS port 203.

Having thus described exemplary embodiments of the present invention, it should be understood by those skilled in the art that the above disclosures are exemplary only and that various other alternatives, adaptations and modifications may be made within the scope of the present invention. The presently disclosed embodiments are to be considered in all respects as illustrative and not restrictive. The scope of the invention being indicated by the claims, rather than the foregoing description, and all changes which come within the meaning and range of equivalency of the claims are therefore intended to be embraced therein.

What is claimed is:

1. A multi-channel optical switching system, comprising:
   an in port for receiving a first multi-channel optical signal;
   a wavelength separating medium for separating the first multi-channel optical signal into a first plurality of single-channel optical signals and for combining a second plurality of single-channel optical signals into a second multi-channel optical signal;
   a pass port for transmitting the second multi-channel optical signal;
   a plurality of add ports for receiving at least one of the second plurality of single-channel optical signals;
   means for directing at least one of the second plurality of single-channel optical signals on to an optical path directed to the pass port;
   a lens element in an optical path between the means for directing and the wavelength separating medium; and
   a mirror for reflecting at least one of the second plurality of single-channel optical signals along an optical path to the means for directing, said mirror disposed with respect to said wavelength separating medium such that the optical path from said plurality of add ports to said means for directing does not include said wavelength separating medium.

2. The multi-channel optical switching system of claim 1, further comprising a polarization dependent optical component optically between the wavelength separating medium and the lens element.

3. The multi-channel optical switching system of claim 2, wherein the polarization dependent optical component is a quarter wave plate.

4. The multi-channel optical switching system of claim 1, wherein the wavelength separating medium is a grating.

5. The multi-channel optical switching system of claim 4, wherein the grating is operating at Littrow.

6. The multi-channel optical switching system of claim 1, further comprising a prism optically coupled to the wavelength separating medium.

7. The multi-channel optical switching system of claim 1, wherein the lens element is optically between the means for directing and the mirror.

8. The multi-channel optical switching system of claim 1, wherein each of the plurality of add ports corresponds with one of the second plurality of single-channel optical signals.

9. The multi-channel optical switching system of claim 1, wherein the in port, the pass port, the plurality of add ports, and the means for directing are located on a focal plane.

10. The multi-channel optical switching system of claim 1, wherein the means for directing is at least one of a plurality of programmable mirrors.

11. A multi-channel optical switching system, comprising:
an in port for receiving a first multi-channel optical signal;
a wavelength separating medium for separating the first multi-channel optical signal into a first plurality of single-channel optical signals and for combining a second plurality of single-channel optical signals into a second multi-channel optical signal;
a pass port for transmitting the second multi-channel optical signal;
a plurality of drop ports for transmitting at least one of the first plurality of single-channel optical signals;
means for directing at least one of the first plurality of single-channel optical signals to at least one of the plurality of drop ports;
a lens element in an optical path between the means for directing and the wavelength separating medium; and
a mirror for reflecting at least one of the first plurality of single-channel optical signals to the at least one of the plurality of drop ports, said wavelength separating medium disposed with respect to said mirror so as to provide an optical path from said in port to said pass port that does not include said mirror.

12. The multi-channel optical switching system of claim 11, further comprising a polarization dependent optical component optically between the wavelength separating medium and the lens element.

13. The multi-channel optical switching system of claim 12, wherein the polarization dependent optical component is a quarter wave plate.

14. The multi-channel optical switching system of claim 11, wherein the wavelength separating medium is a grating.

15. The multi-channel optical switching system of claim 14, wherein the grating is operating at Littrow.

16. The multi-channel optical switching system of claim 11, further comprising a prism optically coupled to the wavelength separating medium.

17. The multi-channel optical switching system of claim 11, wherein the lens element is optically between the means for directing and the mirror.

18. The multi-channel optical switching system of claim 11, wherein each of the plurality of drop ports corresponds with one of the first plurality of single-channel optical signals.

19. The multi-channel optical switching system of claim 11, wherein the in port, the pass port, the plurality of drop ports, and the means for directing are located on a focal plane.

20. The multi-channel optical switching system of claim 11, wherein the means for directing is at least one of a plurality of programmable mirrors.

21. A multi-channel optical switching system, comprising:
an in port configured to receive a first multi-channel optical signal;
a wavelength separating medium configured to separate the first multi-channel optical signal into a first plurality of single-channel optical signals and to combine a second plurality of single-channel optical signals into a second multi-channel optical signal;
a pass port configured to transmit the second multi-channel optical signal;
a plurality of add ports configured to receive at least one of the second plurality of single-channel optical signals;
at least one reflective surface configured to direct at least one of the second plurality of single-channel optical signals on to an optical path directed to the pass port;
a lens element in an optical path between the at least one reflective surface and the wavelength separating medium; and
a mirror configured to reflect at least one of the second plurality of single-channel optical signals along an optical path to the at least one reflective surface, said mirror disposed with respect to said wavelength separating medium such that the optical path from said plurality of add ports to the at least one reflective surface does not include said wavelength separating medium.

22. The multi-channel optical switching system of claim 21, further comprising a polarization dependent optical component in an optical path between the wavelength separating medium and the lens element.

23. The multi-channel optical switching system of claim 22, wherein the polarization dependent optical component comprises a quarter wave plate.

24. The multi-channel optical switching system of claim 21, wherein the wavelength separating medium comprises a grating.

25. The multi-channel optical switching system of claim 24, wherein the grating is configured to operate at Littrow.

26. The multi-channel optical switching system of claim 21, further comprising a prism optically coupled to the wavelength separating medium.

27. The multi-channel optical switching system of claim 21, wherein the lens element is disposed in an optical path between the at least one reflective surface and the mirror.

28. The multi-channel optical switching system of claim 21, wherein each of the plurality of add ports corresponds with one of the second plurality of single-channel optical signals.

29. The multi-channel optical switching system of claim 21, wherein the in port, the pass port, the plurality of add ports, and the at least one reflective surface are located on a focal plane.

30. The multi-channel optical switching system of claim 21, wherein the at least one reflective surface comprises a plurality of programmable mirrors.

31. The multi-channel optical switching system of claim 21, wherein the at least one reflective surface comprises a MEMS device.

32. A multi-channel optical switching system, comprising:
an in port configured to receive a first multi-channel optical signal;
a wavelength separating medium configured to separate the first multi-channel optical signal into a first plurality of single-channel optical signals and to combine a second plurality of single-channel optical signals into a second multi-channel optical signal;
a pass port configured to transmit the second multi-channel optical signal;

a plurality of drop ports configured to transmit at least one of the first plurality of single-channel optical signals;

at least one reflective surface configured to direct at least one of the first plurality of single-channel optical signals to at least one of the plurality of drop ports;

a lens element in an optical path between the at least one reflective surface and the wavelength separating medium; and a mirror configured to reflect at least one of the first plurality of single-channel optical signals to the at least one of the plurality of drop ports, said wavelength separating medium disposed with respect to said mirror so as to provide an optical path from said in port to said pass port that does not include said mirror.

33. The multi-channel optical switching system of claim 32, further comprising a polarization dependent optical component disposed in an optical path between the wavelength separating medium and the lens element.

34. The multi-channel optical switching system of claim 33, wherein the polarization dependent optical component comprises a quarter wave plate.

35. The multi-channel optical switching system of claim 32, wherein the wavelength separating medium comprises a grating.

36. The multi-channel optical switching system of claim 35, wherein the grating is configured to operate at Littrow.

37. The multi-channel optical switching system of claim 32, further comprising a prism optically coupled to the wavelength separating medium.

38. The multi-channel optical switching system of claim 32, wherein the lens element is disposed in an optical path between the at least one reflective surface and the mirror.

39. The multi-channel optical switching system of claim 32, wherein each of the plurality of drop ports corresponds with one of the first plurality of single-channel optical signals.

40. The multi-channel optical switching system of claim 32, wherein the in port, the pass port, the plurality of drop ports, and the at least one reflective surface are located on a focal plane.

41. The multi-channel optical switching system of claim 32, wherein the at least one reflective surface comprises a plurality of programmable mirrors.

42. The multi-channel optical switching system of claim 32, wherein the at least one reflective surface comprises a MEMS device.

* * * * *

UNITED STATES PATENT AND TRADEMARK OFFICE
CERTIFICATE OF CORRECTION

PATENT NO. : 7,203,421 B2
APPLICATION NO. : 10/262675
DATED : April 10, 2007
INVENTOR(S) : James P. McGuire It is certified that error appears in the above-identified patent and that said Letters Patent is hereby corrected as shown below:

At column 1, line 6, delete "60/349,968" and insert -- 60/349,963 --, therefor.

At column 1, line 8, delete "discosures" and insert -- disclosures --, therefor.

At column 1, line 45, delete "-620" and insert -- –1620 --, therefor.

Signed and Sealed this

Twenty-first Day of July, 2009

JOHN DOLL
*Acting Director of the United States Patent and Trademark Office*